United States Patent [19]

Peters

[11] Patent Number: 5,164,072
[45] Date of Patent: Nov. 17, 1992

[54] CARBON MONOXIDE OXIDATION CATALYST

[75] Inventor: Alan W. Peters, Rockville, Md.

[73] Assignee: W. R. Grace & Co.-Conn., New York, N.Y.

[21] Appl. No.: 828,095

[22] Filed: Jan. 30, 1992

Related U.S. Application Data

[60] Division of Ser. No. 531,197, May 31, 1990, Pat. No. 5,110,780, which is a continuation of Ser. No. 231,327, Aug. 12, 1988, abandoned.

[51] Int. Cl.$^5$ ............... C10G 11/04; C10G 11/18
[52] U.S. Cl. ................................ 208/122; 208/120
[58] Field of Search .......................... 208/120, 122

[56] References Cited

U.S. PATENT DOCUMENTS

| | | | |
|---|---|---|---|
| 4,369,108 | 1/1983 | Bertolacimi et al. | 208/122 |
| 4,839,026 | 6/1989 | Brown et al. | 208/122 |
| 5,021,146 | 6/1991 | Chin | 208/122 |

Primary Examiner—Carl F. Dees
Attorney, Agent, or Firm—Arthur P. Savage

[57] ABSTRACT

A carbon monoxide oxidation catalyst especially useful as a co-catalyst in fluid catalytic cracking operations is made by impregnating particulate alumina with lanthana and a small amount of platinum. Cerium must be excluded.

5 Claims, No Drawings

CARBON MONOXIDE OXIDATION CATALYST

This is a division, of application Ser. No. 531,197, filed May 31, 1990, now U.S. Pat. No. 5,110,780, which is a continuation of U.S. Ser. No. 231,327 filed Aug. 12, 1988, now abandoned.

RELATED APPLICATION

U.S. Ser. No. 936419 filed Dec. 1, 1986, owned by the same assignee hereof, discloses and claims a sulfur oxide gettering composition comprising a lanthana-alumina complex on an alumina substrate. The La-alumina complex may be distributed on the complex in combination with a platinum-containing carbon monoxide oxidation agent.

FIELD OF THE INVENTION

The present invention relates to carbon monoxide oxidation catalyst compositions and their use.

More specifically the invention contemplates the preparation and use of novel highly efficient catalytic compositions which may be used to control carbon monoxide emissions from a variety of sources, and especially in fluid cracking catalysis (FCC).

The new catalyst compositions comprise platinum and lanthanum oxide deposited on finely divided alumina of a specific type, in specific amounts and manner.

PRIOR ART

U.S. Pat. No. 3,993,572 discloses an alumina monolith, e.g., for an auto exhaust, treated with rare earths generally, and Ce in particular, plus Pt.

U.S. Pat. No. 4,140,655 discloses an alumina monolith, e.g., for an auto exhaust, treated with 1-3 percent La, plus Pt and Rh.

U.S. Pat. No. 4,170,573 discloses an auto exhaust alumina monolith treated with Ce plus La plus Pt.

U.S. Pat. No. 4,528,279 discloses an auto exhaust alumina monolith treated with La and Pt.

U.S. Pat. No. 4,722,920 discloses La on alumina auto exhaust monolith.

U.S. Pat. No. 4,738,946 discloses oxidation catalysts which comprise catalytically active metals such as palladium supported on a lanthanum-beta alumina substrate.

U.K. Patents 2094657 and 2140791 disclose petroleum cracking catalysts which are used to control $SO_x$ emissions that contain a lanthana alumina additive which may also include an oxidation catalyst such as platinum.

H. Schaper et al, Applied Catalysis, 7 (1983) 211-220, describes the preparation of lanthana/alumina catalyst supports.

BACKGROUND OF THE INVENTION

Cracking catalysts which are used to crack hydrocarbon feedstocks become relatively inactive due to the deposition of carbonaceous deposits on the catalyst. These carbonaceous deposits are commonly called coke. After the cracking step, the catalyst passes to a stripping zone where steam is used to remove strippable hydrocarbons from the catalyst. The catalyst then goes to the regenerator, where the catalyst is regenerated by burning the coke in an oxygen-containing gas. This converts the carbon and hydrogen in the coke to carbon monoxide, carbon dioxide and water.

Oxidation catalysts are currently being used in fluid catalytic cracking (FCC) combustion units to oxidize CO to $CO_2$ in the catalyst bed during the coke-burning step in the regenerator. Typically the oxidation catalysts are particulate combustion additives that contain 100 to 1000 ppm Pt and/or Pd supported on alumina. The combustion additives are mixed with FCC catalysts in amounts that provide a Pt/Pd content of about 0.1 to 2 ppm and preferably about 0.1 to 0.8 ppm. The oxidation of CO to $CO_2$ in the catalyst bed yields many benefits. One benefit is the reduction of CO emissions. Another is the avoidance of "after-burning", i.e., the oxidation of CO to $CO_2$ outside the catalyst bed, which results in a loss of heat energy and causes damage to the cyclones and flue gas exit lines. The major benefit in using oxidation catalysts to oxidize CO to $CO_2$ in the catalyst regenerator bed derives from the heat released when the CO is oxidized to $CO_2$. This heat raises the catalyst bed temperature and thereby increases the coke-burning rate. This gives a lower residual carbon level on the regenerated catalyst. This, in turn, makes the regenerated catalyst more active for the cracking step. This increases the amount of useful products produced in the FCC unit.

CO oxidation catalysts (also referred to herein as agents, additives, promoters, compositions, etc.) when intended for use in FCC units, must of course be compatible under the actual conditions used in FCC units and must remain effective for their subsequent function in the regeneration step. Such FCC units conventionally require temperatures of 800°-1000° F. (427°-538° C.) and catalyst residence times of 3 to 15 seconds in the reducing atmosphere of the reactor; followed by temperatures of 800°-1000° F. (427°-538° C.) in the steam atmosphere of the stripper and temperatures of 1100°-1400° F. (593°-760° C.) and catalyst residence times of 5 to 15 minutes in the oxidizing atmosphere of the regenerator. Additionally, CO oxidation agents for use in FCC units must be effective in the presence of the materials present in FCC units, such as cracking catalysts of various compositions and oil feedstocks of various compositions and their cracked products. My novel CO oxidation agents are useful in and compatible with all these FCC conditions.

OBJECTS

It is an object of the present invention to provide a carbon monoxide oxidation catalyst which is active over a long period of time when subjected to multiple regeneration cycles. These catalysts may be used in cracking catalyst compositions which effectively and economically reduce the emission of carbon monoxide from FCC units.

It is a further object to provide a carbon monoxide oxidation additive which may be added to the catalyst inventory of an FCC unit in amounts necessary to reduce carbon monoxide regenerator stack gas emissions to an acceptable level.

It is still a further object to provide a highly effective carbon monoxide oxidation agent which may be advantageously combined with conventional cracking catalyst compositions or used to control carbon monoxide emissions from a variety of processes.

These and still further objects will become apparent to one skilled in the art from the following detailed description and specific examples.

THE INVENTION

Broadly stated, my invention contemplates an improved carbon monoxide oxidation catalyst which comprises an alumina ($Al_2O_3$) substrate having a surface area of at least 45 $M^2/g$ and 5 to 30 percent by weight lanthanum oxide ($La_2O_3$) uniformly distributed on the surface of the alumina substrate. To this lanthana-alumina is added 100–1000 ppm platinum.

In practice, I prefer about 4–8 weight percent $La_2O_3$ and about 200–600 ppm Pt combined with an alumina substrate which has a surface area of 45 to 450 $m^2/g$, preferably 60–200 $m^2/g$. My combustion additives may be mixed with conventional FCC catalysts in amounts which provide a Pt concentration of about 0.1 to 2 ppm and preferably about 0.1 to 0.8 ppm. I use alumina with an average particle size in the range of about 20–200 microns, preferably about 40–120 microns.

Suitable particulate alumina substrates are available from many commercial sources, and comprise the alumina hydrates, such as alpha alumina monohydrate, alpha alumina trihydrate, beta alumina monohydrate, and beta alumina trihydrate. Also suitable are the calcined versions of the above alumina hydrates. These include gamma alumina, chi alumna, eta alumina, kappa alumina, delta alumina, theta alumina, alpha alumina, and mixtures thereof. In a preferred embodiment, the alumina substrate is in the form of microspheroidal particles, with about 90 percent of the particles having diameters in the 20 to 149 micron fluidizable size range. The CO oxidation agent prepared using these microspheroidal particles may be advantageously physically mixed with FCC catalysts in amounts which provide a Pt content of about 0.1 to 5.8 ppm.

A particularly useful substrate is Condea alumina, a gamma alumina of about 120 $m^2/g$ surface area, available commercially from Condea, a German company.

In another preferred embodiment, the alumina substrate is in the form of particles which have an average particle size of less than 20 microns in diameter, and preferably less than 10 microns in diameter. The finished agent prepared using these fine particles may be incorporated in a cracking catalyst composition during the formation of the catalyst particles.

THE LANTHANUM OXIDE COMPONENT

The lanthanum oxide component which is impregnated onto the alumina surface may be obtained as a commercially available lanthanum salt such as lanthanum nitrate, chloride, or sulfate. The lanthanum compound should be substantially free of cerium. In the presence of an adequate amount of $La_2O_3$, say about 6–8 percent, 2 percent Ce is useless. It is actually harmful if the $La_2O_3$ is less.

THE PLATINUM COMPONENT

Various compounds, complexes, or elemental dispersions of platinum in aqueous or organic media may be used to deposit platinum on the lanthana-alumina composite. In addition to $(NH_4)_6Pt(SO_3)_4$, used in the examples, suitable Pt compounds include chloroplatinic acid; potassium platinum chloride; ammonium platinum thiocyanate; platinum tetrammine hydroxide; platinum oxide, sulfide, nitrite, or nitrate; platinum tetrammine chloride; and the like. The impregnation solution is preferably an aqueous solution containing about 0.2 moles of Pt/100 g solution.

Formation of CO-Oxidation Promoter

To prepare my novel carbon monoxide oxidation agent, the alumina substrate is uniformly and thoroughly admixed with a quantity of lanthanum salt solution which will provide the desired uniform dispersion of lanthanum oxide on the alumina surface. Typically, the soluble lanthanum, preferably lanthanum nitrate, is dissolved in water to provide a desired volume of solution which has the desired concentration of the lanthanum salt. The alumina substrate is then impregnated, as uniformly as possible, with the lanthanum salt solution to give the desired amount of lanthanum on the alumina. The impregnated alumina is then calcined at a temperature sufficient to decompose the lanthanum salt and fix the resulting lanthanum oxide uniformly onto the alumina surface. While it is contemplated that calcination temperatures of up to about 1500° F. (816° C.) may be used, calcination temperatures on the order of 1000° F. (538° C.) have been found to be satisfactory. These same calcination temperatures apply to calcination following platinum deposition.

Platinum is now impregnated on the calcined lanthana-alumina composition, as above described. The Pt-La-alumina composite is then dried. Under certain circumstances, e.g., for test purposes, the composite may be activated by reducing in flowing hydrogen at about 900–1350 for 0.1–4 hours, suitably 950° F. for 3 hours, cooling, then calcining for 6 hours at 1350° F. in 50 percent air and 50 percent steam.

The CO-oxidation agent may also be prepared by co-impregnation of the alumina support with a solution which contains both the desired quantity of lanthanum and platinum salts, followed by drying and calcining as indicated above.

Although the CO-oxidation agent of this invention may be used by itself to reduce CO emissions from a variety of processes, it is particularly useful in combinative use with FCC catalysts.

Combined CO-Oxidation Agent/FCC Catalysts, Etc.

The CO oxidation agent of this invention may be used as a separate additive which is added to the base FCC catalyst as a separate particulate component, or the agent may be combined with the base FCC catalyst during the preparation of the latter to obtain catalyst particles which contain the CO oxidation agent as an integral component. For example, the La-Pt-impregnated alumina may be added to an aqueous slurry of FCC catalyst components, followed by spray drying.

The same type of integration may be used with base catalysts other than cracking catalysts.

Cracking catalysts which may be advantageously combined with the CO oxidation agent of the present invention are commercially available compositions and typically comprise crystalline zeolites admixed with inorganic oxide binders and clay. Typically, these catalysts comprise from about 5 to 50 percent by weight crystalline aluminosilicate zeolite in combination with a silica, silica-alumina, or alumina hydrogel or sol binder and optionally from about 10 to 80 percent by weight clay. Zeolites typically used in the preparation of cracking catalysts are stabilized type Y zeolites.

The instant CO-oxidation agents may be combined with a cracking catalyst which comprises an alumina sol, i.e., aluminum chlorhydroxide solution, bound zeolite/clay composition, thereby giving a composition which comprises, e.g., 0.5 to 60 percent by weight CO oxidation agent and the balance cracking catalyst.

In another preferred practice, my CO oxidation agent is combined with a zeolite cracking catalyst which possesses an essentially silica-free matrix. These catalysts are obtained by mixing together the following materials: 5 to 50 weight percent zeolites, 10 to 80 weight percent alumina hydrate (dry basis), and 5 to 40 weight percent aluminum chlorhydroxide sol ($Al_2O_3$), and water. The mixture was spray-dried to obtain a finely divided catalyst composite and then calcined at a temperature of about 1000° F. (538° C.). My CO oxidation agent may be included as a component in the spray dried slurry in lieu of some of the alumina hydrate, or the agent may be physically blended with the catalyst in the amount of 0.5 to 60 weight percent.

My CO oxidation agent catalyzes the oxidation of CO to $CO_2$ (in the presence of air or oxygen) suitably at a temperature in the range of about 1100°–1500° C.

In sum, my CO oxidation agent may be used by itself, apart from other catalysts, or it can be blended with other catalysts in various ways. For example, it may be physically blended with another catalyst, or it may be incorporated into the catalyst particle of the other catalyst by adding it to the other catalyst as the other is being formed.

My CO-oxidation agent, following loss of activity due to prolonged use, may be restored or regenerated by reduction and/or hydrolysis in the presence of a reducing gas and/or steam. Following regeneration, the agent may be returned to the CO-oxidation zone. When the agent is a component of a base cracking catalyst, the cracking catalyst composite may be similarly recycled to the reaction zone.

Having described the basic aspects of my invention, the following examples are given to illustrate specific embodiments thereof.

EXAMPLE 1

A sample of gamma-alumina (Condea) of 40–150 micron particle size and 129 $m^2/g$ surface area is support A. Another sample of the Condea alumina was impregnated with 8 percent $CeO_2$ from a cerium nitrate solution and dried at 120° C. This is support B. A third support was prepared by impregnating the Condea alumina with lanthanum nitrate to 8 percent $La_2O_3$. This is support C. All supports were calcined 3 hours at 1350° F.

EXAMPLE 2

Platinum was impregnated on each support to a level of 500 ppm from a water solution of the salt $(NH_4)_6Pt(SO_3)_4$ containing 0.2 moles Pt/100 g solution. Each material was dried to prepare catalysts AC, BC, CC.

EXAMPLE 3

Each of the three catalysts was activated/deactivated by reducing in flowing hydrogen at 950° F. for 3 hours, cooling, then calcining for 6 hours at 1350° F. in 50 percent air and 50 percent steam.

EXAMPLE 4

The activity of each oxidation catalyst was tested by adding a small amount (0.06g) of the promotor after the deactivation in Example 3 to 19.94 g of a standard commercial FCC catalyst, comprising rare earth exchanged type Y zeolite, binder, and clay, available as "Super D" from W. R. Grace & Co. This was followed by placing the mixture in a reactor at 1050° F., flowing air over the catalyst, then flowing a 2 percent CO stream at 10,000 WHSV for half an hour, and measuring the CO conversion. The results of this test are given in Table 1.

TABLE I

|  | Catalyst | | |
| --- | --- | --- | --- |
|  | AC | BC | CC |
| % CO Conversion | 53 | 34 | 72 |
| ppm Pt on promotor | 493 | 579 | 497 |
| ppm Pt in mixture | 1.479 | 1.737 | 1.477 |

The promotor with cerium (BC) was worse than the control (AC), despite a slightly higher Pt (BC) level. The La-Pt-alumina of the invention (CC) showed very good results.

EXAMPLE 5

A support consisting of 25 percent $La_2O_3$ on Condea alumina was prepared by impregnation and calcination similar to Example 1. Pt was impregnated at a level of 500 ppm in a manner similar to Example 2. The catalyst was reduced as in Example 3 and deactivated for 15 hours, 5 days, and 11 days at 1350° F., 50 percent steam, 50 percent air. A sample of commercial catalyst (CP-3, available from W. R. Grace & Co.), consisting of 810 ppm Pt on alumina was deactivated using the same procedure. Each catalyst after each deactivation was tested as in Example 4 with the results in Table II.

TABLE II

| | CO Conversion, % of Feed | |
| --- | --- | --- |
| Activation after Deactivation | Catalyst: 550 ppm Pt/ 25% $La_2O_3/Al_2O_3$ | Catalyst: CP-3 (810 ppm Pt/$Al_2O_3$) |
| 5 hrs | 64 | 45 |
| 5 days | 49 | 11 |
| 11 days | 49 | 23 |

These results also show the superior performance of the Pt-lanthana-alumina catalyst of the invention.

My invention will be seen to present several aspects:
(1) The CO-oxidation agent per se (Pt-La-on alumina).
(2) Method of forming the CO-oxidation agent of (1).
(3) Method of oxidizing CO to $CO_2$ using the CO-oxidation agent of (1).
(4) Composition comprising a hydrocarbon cracking catalyst and the CO-oxidation agent of (1).
(5) Method of forming the catalyst composition of (4).
(6) Method of oxidizing CO to $CO_2$ using the catalyst composition of (4).

More specifically, the composition of (1) may be defined as:

A CO-oxidation catalyst or promoter containing Pt and $La_2O_3$ on alumina substrate, characterized in that
(a) the substrate consists of finely divided particles, average particle size about 40–120 microns;
(b) the La is impregnated into the substrate, followed by
(c) impregnating the Pt into the La-impregnated substrate;
(d) the La as $La_2O_3$ is about 4–30 weight percent of the catalyst;
(e) the Pt is about 50–1000 ppm of the promoter;
(f) the promoter is cerium-free; and
(g) the substrate has a surface area of at least 45 $m^2/g$.

I claim:

1. In a method for cracking hydrocarbon feedstocks comprising:
   (a) reacting hydrocarbon feedstocks with a catalyst which comprises a hydrocarbon cracking catalyst and a carbon monoxide oxidation catalyst under catalytic cracking conditions to obtain a cracked product stream and a catalyst composition combined with coke;
   (b) passing the coked catalyst composition to a steam stripping zone to remove the strippable hydrocarbons from the catalyst composition;
   (c) passing the stripped catalyst composition to a regeneration zone wherein the coke is oxidized to carbon monoxide, carbon dioxide, and water; and
   (d) returning the regenerated catalyst composition obtained in step (c) to the reacting step (a); the improvement comprising:
   including as said carbon monoxide oxidation catalyst a composition comprising about 4 to 30 weight percent lanthana and about 50 to 1000 ppm platinum on an alumina substrate having a surface area of about 45 to 450 $m^2/g$, said catalyst being substantially cerium free and having an average particle size of about 20 to 200 microns.

2. The method of claim 1 wherein the cracking catalyst and oxidation catalyst has a particle size of about 40 to 120 microns.

3. The method of claim 1 wherein lanthana is about 4-8 weight percent, platinum is about 200-800 ppm, and substrate surface area is about 60-200 $m^2/g$.

4. The method of claim 1 wherein lanthana is about 8 percent, platinum is about 500 ppm, and substrate surface area is about 130 $m^2/g$.

5. The method of claim 1 conducted under fluid catalytic cracking conditions.

* * * * *